(12) United States Patent
Romero et al.

(10) Patent No.: US 7,545,065 B1
(45) Date of Patent: Jun. 9, 2009

(54) SPIN-STABILIZED MAGNETIC LEVITATION WITHOUT VERTICAL AXIS OF ROTATION

(75) Inventors: Louis Romero, Albuquerque, NM (US); Todd Christenson, Albuquerque, NM (US); Gene Aaronson, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 504 days.

(21) Appl. No.: 11/231,532

(22) Filed: Sep. 21, 2005

Related U.S. Application Data

(60) Provisional application No. 60/612,593, filed on Sep. 22, 2004.

(51) Int. Cl.
*H02K 7/09* (2006.01)
(52) U.S. Cl. ............................................. 310/90.5
(58) Field of Classification Search ............... 310/90.5
See application file for complete search history.

(56) References Cited

U.S. PATENT DOCUMENTS 5,404,062 A    4/1995   Hones et al.

6,420,810 B1 *  7/2002  Jeong .................. 310/90.5

OTHER PUBLICATIONS

Romero, L.A., "Spin stabilized magnetic levitation of horizontal rotors" SIAM Journal on Applied Mathematics, vol. 63, 2002, vol. 63, No. 6, p. 2176-94.*
G. Genta, et al, Gyroscopic Stabilization of Passive Magnetic Levitation, Meccanica, 34, 1999, pp. 411-424.
W. Paul, Electromagnetic Traps for Charged and Neutral Particles, Reviews of Modern Phys., vol. 62, No. 3, 1990, pp. 531-540.
J. Howard and R. Mackay, Linear Stability of Symplectic Maps, J. Math. Phys., 28 (5), 1987, pp. 1036-1051.

* cited by examiner

*Primary Examiner*—Quyen Leung
*Assistant Examiner*—David W. Scheuermann
(74) *Attorney, Agent, or Firm*—Madelynne J. Farber

(57) ABSTRACT

The symmetry properties of a magnetic levitation arrangement are exploited to produce spin-stabilized magnetic levitation without aligning the rotational axis of the rotor with the direction of the force of gravity. The rotation of the rotor stabilizes perturbations directed parallel to the rotational axis.

24 Claims, 10 Drawing Sheets

$$Energy = U(\underline{x}, \underline{d}), \quad \text{—31}$$

$$32 \text{—} \quad \Delta_x^2 U = 0,$$

FIG. 3

$$41 \text{—} \quad U(x, y, z, d_x, d_y, d_z) = U(-x, y, z, d_x, -d_y, -d_z),$$

$$F = -\nabla_x U(\underline{x}, \underline{d}), \quad \text{—51}$$

$$52 \text{—} \quad \underline{\tau} = -\underline{d} \times \nabla_d U(\underline{x}, \underline{d}).$$

FIG. 5

$$61 \text{—} \quad U(x, 0, z, 1, 0, 0) = U(-x, 0, z, 1, 0, 0),$$

$$62 \text{—} \quad U(0, y, z, 1, 0, 0) = U(0, -y, z, 1, 0, 0).$$

$$63 \text{—} \quad F_x(0, 0, z, 1, 0, 0) = -\frac{\partial U(0, 0, z, 1, 0, 0)}{\partial x} = 0,$$

$$64 \text{—} \quad F_y(0, 0, z, 1, 0, 0) = -\frac{\partial U(0, 0, z, 1, 0, 0)}{\partial y} = 0.$$

$$65 \text{—} \quad U(0, 0, z, 1, d_y, d_z) = U(0, 0, z, 1, -d_y, -d_z).$$

$$66 \text{—} \quad \underline{\tau}(0, 0, z, 1, 0, 0) = 0.$$

FIG. 6

$$L_y = I_1 \dot{\phi} + I_3 \omega_0 \theta,$$
$$L_z = I_1 \dot{\theta} - I_3 \omega_0 \phi,$$

FIG. 7

$$m\ddot{x} = F_x(x, y, z, \theta, \phi),$$
$$m\ddot{y} = F_y(x, y, z, \theta, \phi),$$
$$m\ddot{z} = F_z(x, y, z, \theta, \phi),$$
$$I_1 \ddot{\theta} - I_3 \omega_0 \dot{\phi} = \tau_z(x, y, z, \theta, \phi),$$
$$I_1 \ddot{\phi} + I_3 \omega_0 \dot{\theta} = \tau_y(x, y, z, \theta, \phi).$$

FIG. 8

$$m\ddot{y} + A_1 y = 0,$$
$$m\ddot{z} + A_2 z = 0,$$
$$m\ddot{x} - Ax - B\phi = 0,$$
$$I_1 \ddot{\theta} - I_3 \omega_0 \dot{\phi} - C_1 \theta = 0,$$
$$I_1 \ddot{\phi} + I_3 \omega_0 \dot{\theta} - C_2 \phi - Bx = 0.$$

FIG. 9

$$x = \sqrt{I_1/m}\,\hat{x},$$

$$t = \sqrt{m/A}\,\hat{t}.$$

101 → $\ddot{x} - x - \sqrt{\Lambda}\,\phi = 0,$

102 → $\ddot{\theta} - \Omega\dot{\phi} - \Gamma_1 \theta = 0,$

103 → $\ddot{\phi} + \Omega\dot{\theta} - \Gamma_2 \phi - \sqrt{\Lambda}\,x = 0.$ 104 → $\Gamma_1 = \dfrac{mC_1}{I_1 A},$ 105 → $\Gamma_2 = \dfrac{mC_2}{I_1 A},$ 106 → $\Lambda = \dfrac{mB^2}{I_1 A^2},$ 107 → $\Omega^2 = \dfrac{I_3^2 \omega_0^2 m}{I_1^2 A}.$

FIG. 10

112 ↘
$(\sigma^2 + 1)((\sigma^2 + \Gamma_1)(\sigma^2 + \Gamma_2) - \Omega^2 \sigma^2) - \Lambda(\sigma^2 + \Gamma_1) = 0.$ $e^{i\sigma t}$ ← 111

FIG. 11

121⟶
$$Q(q,\Omega) = q^3 + q^2(1+\Gamma_1+\Gamma_2-\Omega^2) + q(\Gamma_1+\Gamma_2+\Gamma_1\Gamma_2-\Lambda-\Omega^2) + \Gamma_1\Gamma_2-\Lambda\Gamma_1$$
$$= 0,$$

122⟶ $q = \sigma^2.$

FIG. 12

$$\Omega^2 > 1 + \Gamma_1 + \Gamma_2,$$

$$\Gamma_1 + \Gamma_2 + \Gamma_1\Gamma_2 - \Lambda > \Omega^2,$$

$$\Lambda\Gamma_1 > \Gamma_1\Gamma_2,$$

131⟶ $\Lambda > 0.$

FIG. 13

$\Lambda = \gamma/\epsilon^2,$ ⟵ 141
$\Gamma_1 = \gamma_1/\epsilon^2,$ ⟵ 142
$\Gamma_2 = \gamma_2/\epsilon^2,$ ⟵ 143
$\Omega = \omega/\epsilon.$ ⟵ 144

FIG. 14

$\sigma^2\gamma_2 = -\gamma_2.$

FIG. 15

$$\gamma_2 > 0 \quad \longleftarrow 161$$
$$\lambda - \gamma_2 > 0. \quad \longleftarrow 162$$
$$\sigma = \hat{\sigma}/\epsilon. \quad \longleftarrow 163$$
$$\hat{\sigma}^2(\hat{\sigma}^2 + \gamma_1)(\hat{\sigma}^2 + \gamma_2) - \Omega^2 \hat{\sigma}^2) = 0. \quad \longleftarrow 164$$
$$(\hat{\sigma}^2 + \gamma_1)(\hat{\sigma}^2 + \gamma_2) - \Omega^2 \hat{\sigma}^2 = 0. \quad \longleftarrow 165$$

166 ↘

$$\Gamma_1 \Gamma_2 > 0, \qquad \Gamma_1 + \Gamma_2 - \Omega^2 < 0$$

$$(\Gamma_1 + \Gamma_2 - \Omega^2)^2 - 4\Gamma_1 \Gamma_2 > 0$$
$$\Gamma_1 > 0 \quad \Gamma_2 > 0 \quad \longleftarrow 166$$

FIG. 16

$$\Gamma_2 \phi + \sqrt{\Lambda x} = 0. \quad \longleftarrow 171$$
$$\phi = -\sqrt{\Lambda x}/\Gamma_2. \quad \longleftarrow 172$$
$$\ddot{x} + x(\Lambda/\Gamma_2 - 1) = 0. \quad \longleftarrow 173 \qquad \Lambda > \Gamma_2. \quad \longleftarrow 174$$
$$\Gamma_2 > 0, \quad \longleftarrow 175$$

FIG. 17

$$-i\Omega\sigma\phi - \Gamma_1 \theta = 0,$$
$$i\sigma\Omega\theta - \Gamma_2 \phi - \sqrt{\Lambda x} = 0.$$
$$181 \longleftarrow (\sigma^2 + 1)x + \sqrt{\Lambda}\phi = 0$$

FIG. 18

$191 \longrightarrow (\sigma^2+1)(\Gamma_1 \Gamma_2 - \Omega^2 \sigma^2) - \Gamma_1 \Lambda = 0.$ $192 \longrightarrow \Gamma_1 \Gamma_2 > \Omega^2, \Lambda > \Gamma_2, = 0.$ $(z-\Gamma_2)^2 - 4z(\Lambda-\Gamma_2) > 0,$ $194 \searrow$ $\dfrac{\Omega^2}{\Gamma_1} < z_- \qquad z = \dfrac{\Omega^2}{\Gamma_1}.$ $193 \longrightarrow z\pm = 2\Lambda - \Gamma_2 \pm \sqrt{(2\Lambda-\Gamma_2)^2 - \Gamma_2^2}.$

FIG. 19

$\Gamma_1 = \gamma_1/\epsilon, \Gamma_2 = \gamma_2/\epsilon, \Lambda = \lambda/\epsilon^2, \longleftarrow 201$ $\left.\begin{array}{r}\Gamma_1 > 0, \\ \Gamma_2 > 0, \\ \Lambda > \Gamma_2, \\ \Omega^2 > \Gamma_1 + \Gamma_2 + 2\sqrt{\Gamma_1 \Gamma_2}, \\ \Omega^2 < \Gamma_1 z_-.\end{array}\right\} 202$

FIG. 20

$$\Gamma_1 = \hat{\Gamma}_1/\epsilon^2, \Gamma_2 = \hat{\Gamma}_2/\epsilon^2 \, and \, \Lambda = \hat{\Lambda}/\epsilon^2 \, (\hat{\Gamma}_1 = 1., \hat{\Gamma}_2 = 1.5, \hat{\Lambda} = 2).$$

$$f(x+\delta/2, y, z_0 + z) = \alpha_0 x + \alpha_1 z + \beta_0 xz + \frac{1}{2}\beta_1(x^2 - y^2 - z^2) + \frac{1}{2}\beta_2(y^2 - z^2) + \Gamma_+(x, y, z),$$

$$\Gamma_+(x, y, z_0 + z) = \gamma_0(x^3/3 - xy^2/2 - xz^2/2) + \gamma_1(-xy^2/2 - xz^2/2)$$
$$+ \gamma_2(x^3/6 - x^2 z/2) + \gamma_3(z^3/6 - y^2 z/2) + \cdots.$$

$$f(x+\delta/2, y, z_0 + z) = \alpha_0 x - \alpha_1 z + \beta_0 xz - \frac{1}{2}\beta_1(x^2 - y^2 - z^2) - \frac{1}{2}\beta_2(y^2 - z^2) + \Gamma_-(x, y, z),$$

$$\Gamma_-(x, y, z_0 + z) = \gamma_0(x^3/3 - xy^2/2 - xz^2/2) + \gamma_1(-xy^2/2 - xz^2/2)$$
$$- \gamma_2(x^3/6 - x^2 z/2) - \gamma_3(z^3/6 - y^2 z/2) + \cdots.$$

FIG. 23

$$\underline{p}_i = (\pm a_i, \pm b_i, c_i), \quad i = 1, N,$$

$$\underline{M}_i = (0, 0, d_i), \quad i = 1, N.$$

FIG. 25

$$L = \sum_{i=1}^{N} d_i L(i).$$

FIG. 26

SPIN-STABILIZED MAGNETIC LEVITATION WITHOUT VERTICAL AXIS OF ROTATION

This application claims the priority under 35 U.S.C. §119 (e)(1) of co-pending provisional application Ser. No. 60/612, 593, filed Sep. 22, 2004 and incorporated herein by reference.

This invention was developed under Contract DE-AC04-94AL8500 between Sandia Corporation and the U.S. Department of Energy. The U.S. Government has certain rights in this invention.

FIELD OF THE INVENTION

The invention relates generally to levitating objects and, more particularly, to levitating objects in magnetic fields.

BACKGROUND OF THE INVENTION

Earnshaw's theorem implies that it is impossible to achieve stable static magnetic levitation in a static magnetic field. However, the discovery of the Levitron™ has shown that it is in fact possible for a spinning top to be in stable equilibrium in a static magnetic field. This phenomenon, referred to herein as spin-stabilized magnetic levitation has been widely analyzed in the literature. The Levitron™ itself is described in U.S. Pat. No. 5,404,062, incorporated herein by reference. In general, in conventional spin-stabilized magnetic levitation devices such as the Levitron™ the rotational (spinning) motion of the rotor overcomes lateral instability of the rotor in the magnetic field. The conventional spin-stabilized devices are axisymmetric, and are limited to rotation about a vertical axis, that is, an axis aligned with the direction of the force of gravity.

It is desirable in view of the foregoing to provide for spin-stabilized magnetic levitation that does not require alignment of the rotational axis with the direction of the force of gravity.

Exemplary embodiments of the invention use the symmetry properties of a magnetic levitation arrangement to produce spin-stabilized magnetic levitation without aligning the rotational axis with the direction of the force of gravity. The rotation of the rotor stabilizes perturbations directed parallel to the rotational axis.

BRIEF DESCRIPTION OF THE DRAWINGS

FIGS. 3 and 4 mathematically illustrate symmetry properties of the arrangements shown in FIGS. 1 and 2.

FIGS. 5 and 6 mathematically illustrate equilibrium implications of the symmetry properties of FIGS. 3-6.

FIGS. 7-20 mathematically illustrate a linear stability analysis of the equilibrium conditions of FIGS. 7-10 according to exemplary embodiments of the invention.

FIG. 23 illustrates Taylor series expansions of the magnetic potentials about the dipole locations in arrangement such as shown in FIG. 2.

FIGS. 25 and 26 mathematically illustrate exemplary operations that can be performed to determine a configuration of magnets that will provide a desired set of dynamical constants according to exemplary embodiments of the invention.

DETAILED DESCRIPTION

Figure 1:
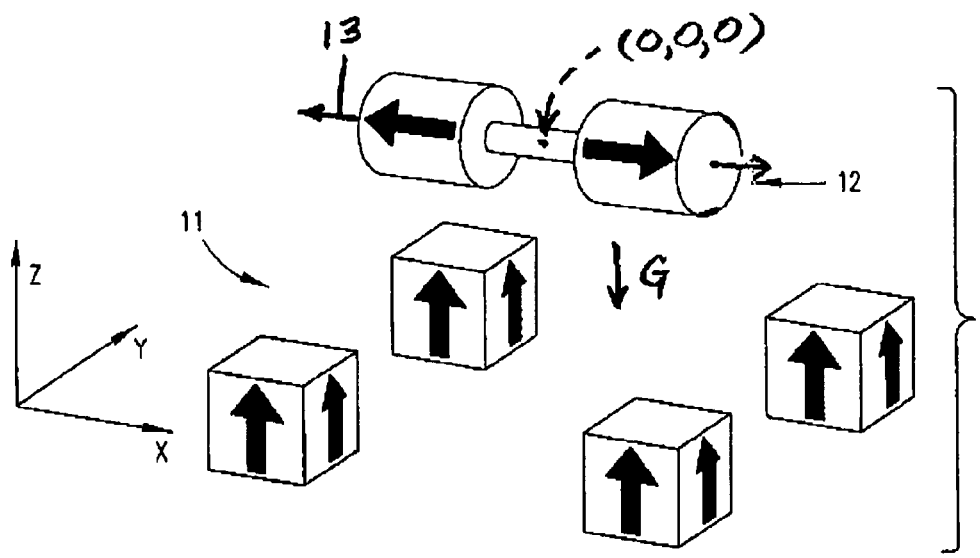
FIG. 1 diagrammatically illustrates a spin-stabilized magnetic levitation arrangement according to exemplary embodiments of the invention.
Figure 2:
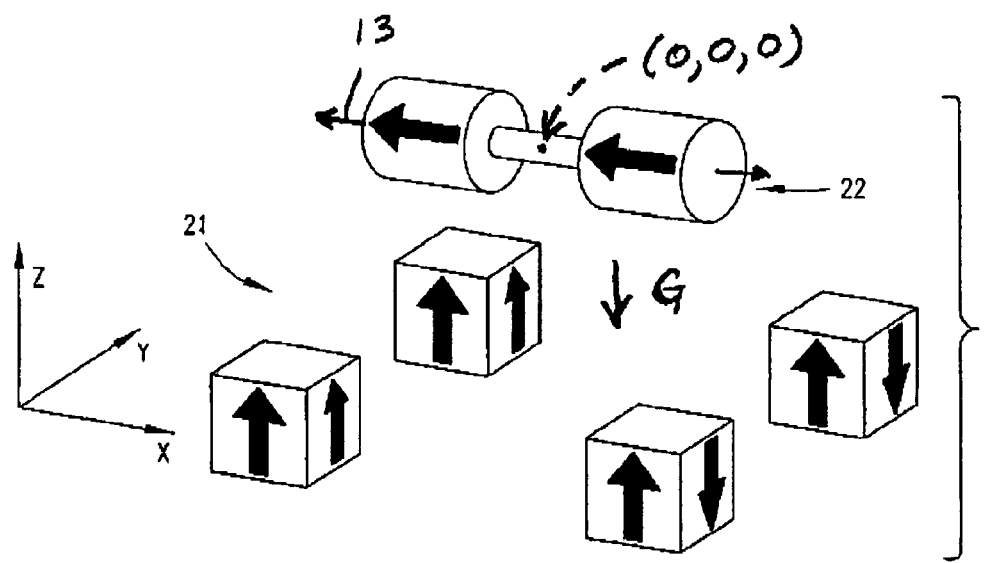
FIG. 2 diagrammatically illustrates a spin-stabilized magnetic levitation arrangement according to further exemplary embodiments of the invention.

Exemplary embodiments of the present invention control magnetic symmetries so that a spinning rotor experiences equilibrium of magnetic forces and torques in all directions except the vertical force of gravity direction. The rotor spins about an axis extending in a direction other than the vertical direction, and the spin stabilizes the axial instability of the rotor. FIGS. 1 and 2 diagrammatically illustrate exemplary embodiments of magnetic levitation arrangements according to the invention that can produce the aforementioned magnetic equilibrium conditions.

In the example of FIG. 1, the magnets of the base magnet system 11 produce a magnetic potential that is symmetric with respect to reflections about the planes x=0 and y=0. In some embodiments, all magnets of the base magnet system 11 are dipoles located in a plane z=constant, and they all point in the z direction. A first dipole located at (x0, y0, z0) has companion dipoles located at points (+/−x0, +/−y0, z0). All of the magnets have their dipoles pointing in the same direction. The rotor 12 is axisymmetric and carries a system of magnets that produces a magnetic potential that is symmetric with respect to reflection about its midplane. (In the examples shown in FIGS. 1 and 2, the midplane of the rotor is parallel to the x=0 plane.) The rotor 12 has its center of mass at spatial coordinates x=0, y=0, and z=0, and its axis of symmetry points in the x direction. In some embodiments, the rotor 12 includes two dipoles located on its axis of symmetry, positioned symmetrically about its midplane, and pointing in opposite directions along the axis of symmetry.

In the example of FIG. 2, the magnets of the base system 21 produce a magnetic potential that is symmetric with respect to reflection about the plane y=0 and is antisymmetric with respect to reflection about the plane x=0. A first dipole located at (x0, y0, z0) has companion dipoles located at points (+/−x0, +/−y0, z0). The dipole located at (x0, −y0, z0) points in the same direction as the first dipole, and the dipoles located at (−x0, +/−y0, z0) point in the opposite direction. In general, the base system 21 can have dipoles pointing in arbitrary directions, as long as appropriately reflected companion magnets are included. The rotor 22 is axisymmetric and carries a system of magnets that produces a magnetic potential that is antisymmetric with respect to reflection about its midplane. The rotor 22 is physically positioned in the magnetic field in the same manner described above with respect to the rotor 12 of FIG. 1. In some embodiments, the rotor 22 includes two dipoles located on its axis of symmetry, positioned symmetrically about its midplane, and pointing in the same direction along the axis of symmetry.

In each of the arrangements of FIGS. 1 and 2, due to the symmetries of the respective configurations, there are no forces in the x and y directions when the rotors are positioned as shown in the magnetic field. Similarly, there are no torques on the rotor. Equilibrium in the z direction can be obtained by suitably adjusting the weight of the rotor and/or the strengths of the magnets so that the force in the z direction balances the force of gravity G, which is assumed to act in the z direction.

Earnshaw's theorem implies that the equilibrium position must be unstable if the rotor is not spinning. Analysis of a spinning rotor in configurations such as shown in FIGS. 1 and 2 reveals that the equations for perturbations in the lateral (e.g., y or z) directions decouple from the equations for angular perturbations and perturbations in the axial direction. This implies that it is not possible to spin-stabilize perturbations in the y and z directions, but that it is possible to spin-stabilize perturbations in the axial direction (parallel to the rotational axis of the rotor). This latter possibility contrasts with conventional systems where a rotor spins about a vertical axis in an axisymmetric field. In these vertical spin axis systems, is not possible to spin-stabilize perturbations in the axial direction. Rather, the vertical spin axis systems operate to spin-stabilize lateral perturbations.

In general, exemplary embodiments of the invention assume that: (1) the rotor and its magnets are axisymmetric; (2) in equilibrium, the rotor is aligned with its axis of symmetry in the x direction, and spins about the x-axis 13; and (3) the center of mass x of the rotor is spatially located at the point (0, 0, 0). As indicated above, FIGS. 1 and 2 illustrate exemplary arrangements that meet these assumptions, and the following discussion is generally applicable to both FIGS. 1 and 2.

Because the rotor is axisymmetric, the energy of the rotor in an arbitrary magnetic field can be written as shown at 31 in FIG. 3, where $\underline{x}$ is the center of mass of the rotor, and $\underline{d}$ is a unit vector pointing in the direction of the axis of symmetry. The energy satisfies equation 32 of FIG. 3, which represents the Laplacian of the energy U with respect to the variable $\underline{x}$. The energy of a system where the potential is antisymmetric with respect to reflections about the x-axis satisfies the symmetry properties shown in FIG. 4. The energy of a system where the potential is symmetric with respect to reflections about the x-axis also satisfies the symmetry properties of FIG. 4.

Assuming a base system and rotor that satisfy the symmetry properties of FIG. 4, equilibrium conditions can be identified. In particular, it can be shown that, if the rotor is placed so that its center of mass is at (0, 0, 0) and its axis of symmetry points in the direction $\underline{d}=(1, 0, 0)$, then there is no torque on the rotor and the only component of force is in the z direction. Appropriate adjustment of the rotor weight and/or the strengths of the magnets can balance this magnetic force with the force of gravity.

It can be demonstrated that the force and torque on the rotor are given by the equations of FIG. 5. As shown, the force 51 depends on the gradient with respect to $\underline{x}$, and the torque 52 depends on the gradient with respect to $\underline{d}$.

The symmetry properties of the energy for both the anti-symmetric (e.g., FIG. 2) and symmetric (e.g., FIG. 1) cases, are shown at 61 and 62 in FIG. 6. When the rotor is placed symmetrically in the field, the magnetic forces Fx and Fy in the x and y directions satisfy equations 63 and 64. To show that the torques vanish, substitute x=y=0 into the symmetry property 41 of FIG. 4 to get the result shown at 65 in FIG. 6. This shows that the energy at x=y=0 is an even function of dy and dx, so the derivatives with respect to dy and dx must vanish. Using the relation shown at 52 in FIG. 5, the expression 66 of FIG. 6 can be seen. It can be seen from 63-66 that, if the rotor is positioned so that its center of mass is at x=y=0, and so that its axis of symmetry points in the x direction, there will be no forces in the x or y directions, and no torques at all.

The kinematics of the rotor can be described in a manner similar to that employed by Genta et al, in *Gyroscopic Stabilization of Passive Magnetic Levitation*, Meccanica, 34 (1999), pp 411-424, incorporated herein by reference. In this description, the coordinates (x, y, z) refer to coordinates fixed in space, and the rotor is assumed to be axisymmetric, with moments of inertia I3 about the axis of symmetry, and I1 about the other two principal axes. Assume that the rotor is oriented by rotating about the z-axis by θ, the y-axis by φ, and then the x-axis by ψ. It can be shown that, if the rotor is spinning about the x-axis with angular velocity ω0, then a small perturbation to this state gives the approximate angular momenta shown in FIG. 7. The expression for Ly has two terms. The first term is the angular momentum that would occur if ω0=0 and the rotor were spinning about the y-axis. The second term is the angular momentum that would occur if the rotor kept spinning about the axis of symmetry with angular velocity ω0, but was slowly tilted by an amount θ about the x-axis. As a result of this tilting, some of the angular momentum that was initially in the x direction gets projected onto the y-axis. A similar interpretation can be given for Lz, the approximate angular momentum in the z direction.

The linearized equations of motion can be written as shown in FIG. 8. In this linear approximation, the forces and torques are linear functions of x, y, z, θ, and φ. The vector $\underline{d}=(1, \theta, -\phi)$. It can be shown that, in the linear approximation, the forces and torques are derivable from a quadratic potential. Moreover, the symmetry properties show that many of the terms in the quadratic potential must be missing. It can therefore be shown that the linearized equations of motion are of the form shown in FIG. 9. Note that the equations for y and z decouple from the other equations. This means that A1 and A2 must both be greater than zero in order to have stability. In other words, the system would have to be stable with respect to lateral perturbations if the rotor were not spinning. Equation 32 of FIG. 3 (or Earnshaw's theorem) implies that A1+A2=A, so the system must be unstable with respect to axial perturbations if the rotor is not spinning.

FIG. 10 introduces dimensionless variables x and t. Dimensionless equations 101-103 are written in terms of the dimensionless variables (after dropping the hats for convenience). Equations 101-103 also introduce the dimensionless parameters 104-107 of FIG. 10.

Turning now to an analysis of the stability of the linearized dynamical equations 101-103, if solutions of the form 111 in FIG. 11 are assumed, this leads to the characteristic polynomial 112. This can be expanded to get equation 121 of FIG. 12, with q from 121 given at 122.

In order for the system to be stable, all of the roots of equation 121 must be real and positive. Descarte's theorem implies that for an equation of the form $z^3+pz^2+qz+r=0$ to have all real and positive roots, it is necessary that p<0, q>0, and r<0. Furthermore, if all of the roots are real, then these conditions are both necessary and sufficient conditions for all of the roots to be positive. This, along with the aforementioned condition that A>0 gives the conditions for stability shown in FIG. 13. The condition 131 is the requirement that A>0 in order to have lateral stability. As with vertically oriented spin-stabilized magnetic levitation, there are upper and lower limit values of Ω for stability.

Figures 21, 22:
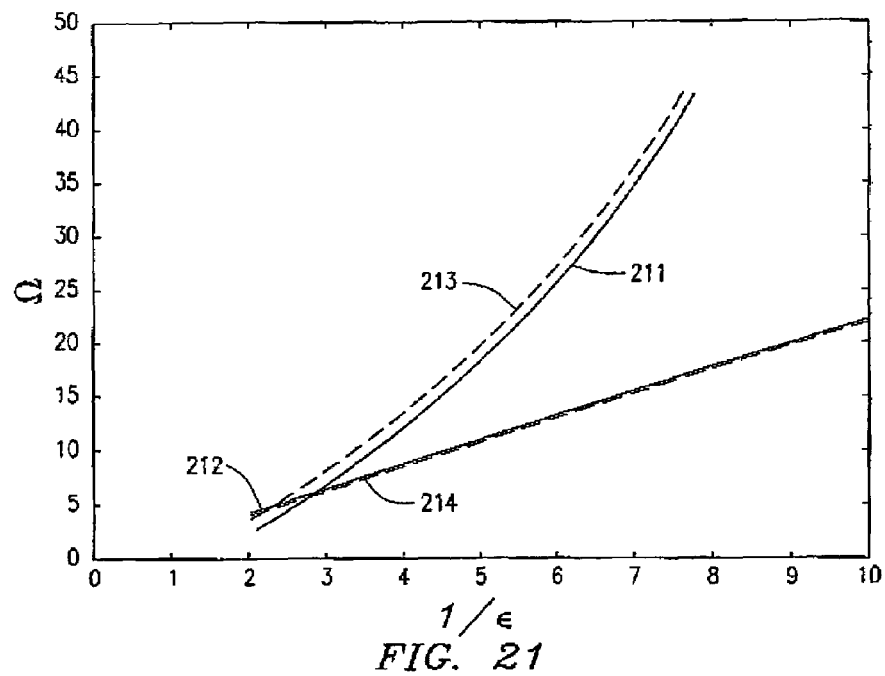
FIG. 21 graphically illustrates curves that define upper and lower limits on the spin rate of the rotors in FIGS. 1 and 2 according to exemplary embodiments of the invention.
FIG. 22 illustrates conditions associated with the curves of FIG. 21.

The parameters used in the equations of FIG. 13 are defined at 141-144 of FIG. 14, and it is assumed that the parameters 141-143 are all large. Substituting 141-144 into equation 112, multiplying by $\epsilon^4$, and setting ε=0, the equation of FIG. 15 is obtained. This gives two roots of the sixth order polynomial 121 in FIG. 12. There are only positive solutions to a $\sigma^2$ if the conditions 161 and 162 of FIG. 21 are met. The other four roots can be obtained by assuming the relationship at 163. This results in equation 164 which, after factoring out the leftmost factor, yields equation 165. Equation 165 is the characteristic equation for a spinning rotor in a harmonic potential. Application of the quadratic equation shows that, in order for equation 165 to have all real roots, the five conditions designated at 166 must be met. All of the conditions at 166 can be achieved by selecting a suitably large value of Ω.

These stability conditions can be understood by recognizing that, if the parameters 141-143 are large, and the system is not responding too quickly, equation 101 (FIG. 10) implies the relationship shown at 171 in FIG. 17. This is equivalent to saying that, as the rotor moves around, it orients itself so that there is no torque on it. This gives the expression 172 which, when substituted into equation 101, yields equation 173. This will be a stable harmonic oscillator, subject to the condition 174. This is the first asymptotic stability condition. In order to satisfy condition 174, the condition 175 must be met, which implies that the rotor would want to flip over in the absence of spin.

The second asymptotic stability condition is that the rotor must spin fast enough to avoid flipping over. To analyze this mode, assume that σ is of order 1/ε. In this case, equation 101 implies that x is small compared to φ. This means that x can be ignored when solving equations 102 and 103. This is equivalent to considering a rotor spinning in a potential where the translational energy is ignored.

The asymptotic analysis presented above does not predict the existence of an upper spin rate limit. In order to predict an upper limit, assume again that the parameters 141-143 of FIG. 14 are large. It can be shown that, if Ω is too large, the eigenvalues that are of order one will eventually become unstable. Assuming that σ is order unity, the eigensystem can be approximated by the equations of FIG. 18, which are obtained by ignoring the second derivatives of θ and φ in FIG. 10. FIG. 18 implies equation 191 of FIG. 19, a quadratic equation for $\sigma^2$. In order for equation 191 to have positive real roots, the conditions shown at 192 must be satisfied. This gives a quadratic equation in z whose roots are defined at 193. In order to have real roots, either z<z− or z>z+. However, if z>z+, the other inequalities necessary for positive real roots cannot be satisfied. It therefore follows that the condition 194 must be satisfied. This is the asymptotic prediction for the upper spin rate limit. Assuming that that the parameters 141-143 are of order $1/\epsilon^2$, then the upper limit on the spin rate is also of order $1/\epsilon^2$. On the other hand, the lower spin rate limit is on the order of 1/ε. Accordingly, as ε becomes smaller, the ratio between the upper and lower spin rate limits can become very large.

Collecting now the results from the foregoing asymptotic stability analysis, and assuming the conditions shown at 201 in FIG. 20, the necessary and sufficient conditions for stability are shown at 202. Again, with the parameters 141-143 of order $1/\epsilon^2$, the upper spin rate limit is of order $1/\epsilon^2$, and the lower spin rate limit is of order of 1/ε. This shows that the ratio between the upper and lower spin rates can be increased as desired, by increasing the values of the parameters 141-143 but holding the ratios therebetween fixed.

FIG. 21 graphically illustrates the above-described asymptotic estimates for the upper (211) and lower (212) spin rate limits. Also shown by broken line are more exact upper (213) and lower (214) spin rate limits, as computed using numerical methods. In particular, each curve of FIG. 21 represents a limit on the spin rate Ω as a function of 1/ε, under the conditions specified in FIG. 22.

In some embodiments, the exemplary procedure described below is used to compute the dynamical constants A1, A2, B, C1, and C2 that are needed for stable equilibrium with a given magnet configuration. For simplicity of exposition, it is assumed that the magnets on the rotor can be approximated by dipoles, although the analysis can be extended in a straightforward (though somewhat tedious) manner to magnets approximated as combinations of dipoles, quadrapoles, and octapoles. Assume, for example, that the rotor is positioned within a base magnet system that produces an antisymmetric potential (e.g., as in FIG. 2). That is, the magnetic potential f(x, y, z) satisfies both f(x, y, z)=f(x, −y, z), and f(x, y, z)=−f(−x, y, z). Also assume that when the rotor is oriented in its equilibrium position, it has dipoles positioned at the points (+/−δ/2, 0, z0), both of magnitude $M_R$, and both pointing in the direction (1, 0, 0). The dynamical components in this example are computed under the assumption of a single pair system of dipoles on the rotor. (With more than one dipole system, the overall dynamical constants can be computed as sums of the respectively corresponding dynamical constants computed for each dipole system.)

In order to compute the forces and torques that act upon the rotor as it gets displaced from its equilibrium position, the Taylor series expansions of the magnetic potentials about the points (+/−δ/2, 0, z0) are computed (e.g., up to the cubic terms). The Taylor series for both points are shown in FIG. 23.

Figure 24:
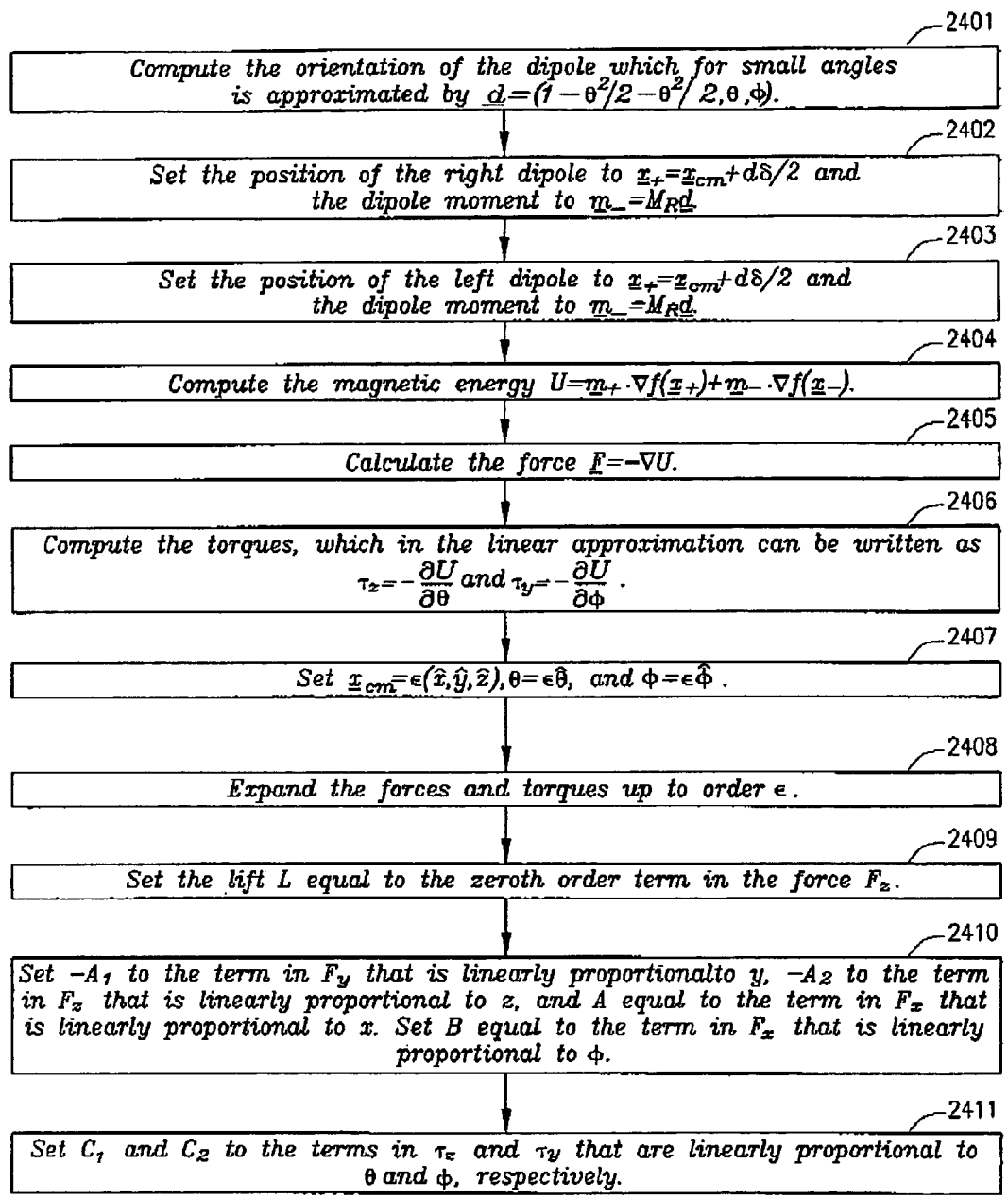
FIG. 24 illustrates operations that can be performed to compute dynamical constants for magnetic levitation arrangements according to exemplary embodiments of the invention.

FIG. 24 illustrates in detail at 2401-2411 exemplary operations for computing the dynamical constants and the lift according to the exemplary embodiments of the invention. The procedure defined by the illustrated operations can be readily implemented using commercially available software such as Mathematica. The operations illustrated at 2401-2411 are self explanatory.

Although the foregoing example of FIGS. 23 and 24 relates to an antisymmetric configuration such as shown in FIG. 2, the same results can also be obtained for a symmetric configuration such as shown in FIG. 1. With the symmetric configuration, the Taylor series expansion about the point (δ/2, 0, z0) is the same as for the antisymmetric configuration, and the expansion about the point (−δ/2, 0, z0) is exactly opposite of that obtained for the antisymmetric configuration. If the fields are defined using the Taylor series expansion about (δ/2, 0, z0), the dynamical constants have the exact same values as those given for the antisymmetric configuration.

In some embodiments, the exemplary procedure described below is used to determine a particular configuration of magnets that will produce a desired set of the dynamical constants. The example described below assumes a system having a magnetic potential that exhibits reflectional symmetry about the x-axis. Assume, for example, an overall base system that consists of 4N dipoles (N systems of four dipoles each) which all point in the z direction. The positions of the dipoles are given by 251 in FIG. 25, and the magnetizations of the dipoles are given by 252. Each value of the index i corresponds to a four magnet system symmetrically positioned in the overall base system. For each value of i, the dynamical parameters A1(i), A2(i), A(i), B(i), C1(i), C2(i), and L(i) can be computed for di=1. The values of the dynamical parameters for the whole system can be obtained by summing over the different sets of magnets multiplied by the strengths of the dipoles. An example of this is shown in FIG. 26. If there are six or more systems of magnets, then there are six equations in six unknowns (recall that A is known in terms of A1 and A2), the strengths di can be chosen as necessary to produce any desired values of the dynamical parameters.

Referring again to FIGS. 1 and 2, these illustrate specific examples of more general symmetry configurations according to the invention. Two general symmetry configurations according to the invention are now described. Both general symmetry configurations use an axisymmetric rotor, with M systems of magnetic dipoles on the axis of symmetry of the rotor. The mass distribution of the rotor is assumed to have reflection symmetry about its midplane. All of the rotor's dipoles point in the direction of the rotor's axis of symmetry.

For purposes of this description of the general configurations, the equilibrium position of the rotor is defined so that the center of mass is at (0, 0, 0) and the axis of symmetry is oriented in the x direction (see also FIGS. 1 and 2). When the rotor occupies this position, the kth system of dipoles on the rotor has dipoles at (+/−δk, 0, 0). Both general symmetry configurations use a base that contains N systems of dipoles. The kth system in the base contains four dipoles, at p1k=(ak, bk, ck), p2k=(−ak, bk, ck), p3k=(ak, −bk, ck), and p4k=(−ak, −bk, ck). In this configuration, if the dipole at p1k of the kth system in the base has a magnetic dipole moment of (pk, qk, rk), then the remaining dipoles at p2k, p3k, and p4k of the kth system have respective magnetic dipole moments of (−pk, qk, rk), (pk, −qk, rk), and (−pk, −qk, rk). (Note that N=1 in FIGS. 1 and 2.)

For a symmetric rotor configuration, when the rotor is in its equilibrium position, its kth dipole system has dipoles at (+/−δk, 0, 0) with dipoles moments of (+/−mk, 0, 0). That is, the symmetrically placed dipoles are pointing in opposite directions. In this configuration, if the dipole at p1k of the kth system in the base has a dipole moment of (pk, qk, rk), then the remaining dipoles at p2k, p3k, and p4k of the kth system in the base have respective dipole moments (−pk, qk, rk), (pk, −qk, rk), and (−pk, −qk, rk). (Note that pk=qk=0 in FIG. 1.)

For an antisymmetric rotor configuration, when the rotor is in its equilibrium position, its kth dipole system has dipoles at (+/−δk, 0, 0) with dipoles moments of (mk, 0, 0). That is, the symmetrically placed dipoles are pointing in the same direction. In this configuration, if the dipole at p1k of the kth system in the base has a dipole moment of (pk, qk, rk), then the remaining dipoles at p2k, p3k, and p4k of the kth system in the base have respective dipole moments (pk, −qk, −rk), (pk, −qk, rk), and (pk, qk, −rk). (Note that pk=qk=0 in FIG. 2.)

Having now described symmetry configurations according to the invention in general terms, a detailed example of a specific design configuration according to the invention is set forth in the Appendix.

Exemplary features of the invention described in detail above are summarized hereinbelow.

1. If the system is constructed according to the above-described symmetry configurations, then equilibrium of forces and torques is achieved except for equilibrium in the z direction.

2. For a given equilibrium condition, the dynamics governing small displacements from the equilibrium are determined by the following parameters: the mass of the rotor; the moment of inertia I3 of the rotor about the axis of symmetry; the moment of inertia I1 of the rotor about the axes perpendicular to the axis of symmetry; the rotor spin rate $\omega$; and the dynamical constants A1, A2, C1, C2, A, and B.

3. For a given configuration of magnets, the dynamical parameters can be determined either theoretically, or by numerically computing the derivatives of the forces and the torques as the center of mass and orientation of the rotor are changed. In particular, A1 is the derivative of the force in the y direction with respect to a change in the y position of the rotor, A2 is the derivative of the force in the z direction with respect to a change in the z position of the rotor, and A is equal to A1+A2. C1 gives the derivative of the torque about the z-axis with respect to the angle $\theta$ of the rotation of the rotor about the z-axis. C2 gives the derivative of the torque about the y-axis with respect to the angle $\phi$ of the rotation of the rotor about the y-axis. B gives the derivative of the force in the x direction with respect to the angle $\phi$ of the rotation of the rotor about the y-axis.

4. Given the dynamical parameters described above, the stability or instability of the system can be determined therefrom. For some configurations of magnets, the system is unstable for all values of spin rates. For some configurations, there is a range of spin rates within which stability is achieved.

5. The conditions for stability are easily expressed in terms of the aforementioned dimensionless parameters $\Gamma 1$, $\Gamma 2$, $\Lambda$, and $\Omega$.

Although exemplary embodiments of the invention have been described above in detail, this does not limit the scope of the invention, which can be practiced in a variety of embodiments.

What is claimed is:

1. A method of levitating a rotor that is symmetric about a rotational axis thereof and carries thereon a magnet arrangement, comprising:

rotating the rotor about the rotational axis; and while the rotor is rotating about the rotational axis, using magnetic force and the rotation of the rotor to stabilize the rotor with respect to perturbations acting on the rotor in a direction parallel to the rotational axis, wherein said stabilization of the rotor is dependent upon the rotation of the rotor.

2. The method of claim 1, including positioning the rotor in a magnetic field that is reflectionally symmetric about each of two mutually orthogonal planes.

3. The method of claim 2, wherein the rotational axis lies in one of said planes when the rotor occupies an equilibrium position in said magnetic field.

4. The method of claim 1, including positioning the rotor in a magnetic field that is reflectionally symmetric about a first plane and reflectionally antisymmetric about a second plane that is orthogonal to the first plane.

5. The method of claim 4, wherein the rotational axis lies in one of said first and second planes when the rotor occupies an equilibrium position in said magnetic field.

6. A method of balancing a force of gravity to levitate a rotor that is symmetric about a rotational axis thereof and carries thereon a magnet arrangement, comprising:

rotating the rotor about the rotational axis while the rotational axis is oriented in a first direction other than a second direction of the force of gravity; and while the rotor is rotating about the rotational axis with the rotational axis oriented in the first direction, using magnetic force and the rotation of the rotor to stabilize the rotor with respect to perturbations acting on the rotor in a perturbation direction, wherein said stabilization of the rotor is dependent upon the rotation of the rotor.

7. The method of claim 6, wherein the first direction is orthogonal to the second direction.

8. The method of claim 6, wherein the perturbation direction is parallel to the rotational axis.

9. The method of claim 6, including positioning the rotor in a magnetic field that is reflectionally symmetric about each of two mutually orthogonal planes.

10. The method of claim 9, wherein the rotational axis lies in one of said planes when the rotor occupies an equilibrium position in said magnetic field.

11. The method of claim 6, including positioning the rotor in a magnetic field that is reflectionally symmetric about a first plane and reflectionally antisymmetric about a second plane that is orthogonal to the first plane.

12. The method of claim 11, wherein the rotational axis lies in one of said first and second planes when the rotor occupies an equilibrium position in said magnetic field.

13. An apparatus for levitating a rotor that is symmetric about a rotational axis thereof and carries thereon a magnet arrangement, comprising:

a first magnet apparatus;

a second magnet apparatus cooperable with said first magnet apparatus for producing a magnetic field which, when the rotor is positioned therein, cooperates with rotation of the rotor about the rotational axis to stabilize the rotor with respect to perturbations acting on the rotor in a direction parallel to the rotational axis, wherein said stabilization of the rotor is dependent upon the rotation of the rotor.

14. The apparatus of claim 13, wherein said magnetic field is reflectionally symmetric about each of two mutually orthogonal planes.

15. The apparatus of claim 14, wherein the rotational axis lies in one of said planes when the rotor occupies an equilibrium position in said magnetic field.

16. The apparatus of claim 13, wherein said magnetic field is reflectionally symmetric about a first plane and reflectionally antisymmetric about a second plane that is orthogonal to the first plane.

17. The apparatus of claim 16, wherein the rotational axis lies in one of said first and second planes when the rotor occupies an equilibrium position in said magnetic field.

18. An apparatus that balances a force of gravity to levitate a rotor that is symmetric about a rotational axis thereof and carries thereon a magnet arrangement, comprising:

a first magnet apparatus; and a second magnet apparatus cooperable with said first magnet apparatus for producing a magnetic field which, when the rotor is positioned therein and is rotating about the rotational axis with the rotational axis oriented in a first direction other than a second direction of the force of gravity, cooperates with said rotation of the rotor to stabilize the rotor with respect to perturbations acting on the rotor in a perturbation direction, wherein said stabilization of the rotor is dependent upon the rotation of the rotor.

19. The apparatus of claim 18, wherein the first direction is orthogonal to the second direction.

20. The apparatus of claim 18, wherein the perturbation direction is parallel to the rotational axis.

21. The apparatus of claim 18, wherein said magnetic field is reflectionally symmetric about each of two mutually orthogonal planes.

22. The apparatus of claim 21, wherein the rotational axis lies in one of said planes when the rotor occupies an equilibrium position in said magnetic field.

23. The apparatus of claim 18, wherein said magnetic field is reflectionally symmetric about a first plane and reflectionally antisymmetric about a second plane that is orthogonal to the first plane.

24. The apparatus of claim 23, wherein the rotational axis lies in one of said first and second planes when the rotor occupies an equilibrium position in said magnetic field.

* * * * *